Feb. 6, 1962 P. HUSKA 3,020,330

TRANSPOSED ELECTRICAL BUS DUCTS

Filed April 27, 1959

2 Sheets-Sheet 1

INVENTOR.
PAUL HUSKA
BY W. H. [illegible]
AGENT

Feb. 6, 1962 | P. HUSKA | 3,020,330

TRANSPOSED ELECTRICAL BUS DUCTS

Filed April 27, 1959 | 2 Sheets-Sheet 2

INVENTOR.
PAUL HUSKA
BY
W. H. Maxwell
AGENT

United States Patent Office 3,020,330
Patented Feb. 6, 1962

3,020,330
TRANSPOSED ELECTRICAL BUS DUCTS
Paul Huska, 739 Moreno Ave., Los Angeles, Calif.
Filed Apr. 27, 1959, Ser. No. 809,041
8 Claims. (Cl. 174—34)

Figure 1:
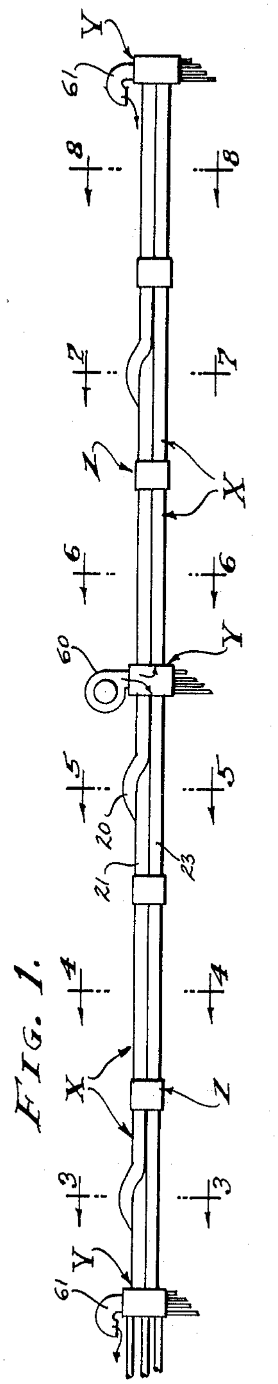

This invention relates to electrical busses and is particularly concerned with tubular ducting for said busses, it being a general object of this invention to provide for isolation of separate busses and transposition of the busses in order to reduce inductive reactance which represents power loss.

Common conductors to which several electrical devices are connected are referred to as bus-bars or busses. These busses may be solid copper wire, tubing, or flat bars, depending upon space and electrical requirements, and they are usually installed in spaced relationship with each other in order to allow for free circulation of air to assist in cooling of the bars. Investigations have shown certain phenomenon to exist depending upon the particular nature of electrical current being handled, for instance, bus-bars heat more when carrying high-cycle alternating current than when carrying low-cycle alternating current, and further, inductive reactance is allowed to occur when the busses run parallel with each other, said reactance resulting in power loss, difficulties in voltage regulation, overheating of the busses, and in general operating difficulties in the electrical devices that are involved and operated or powered by the current being handled by the busses.

It has been common practice to run bus conductors through tubing and to provide insulation surrounding the conductors to electrically isolate them from the tubing, said tubing being semi-conductive or metallic. Further, it has been usual practice to transpose conductors by individual manipulation of each conductor into the desired installed position. That is, the individual conductors, or the tubes for carrying them, are separately installed and each is fashioned to suit the particular installation involved, resulting in slow and costly installation and in costly repairs when modification is desired. In other words, the usual electrical bus installation is characterized by costly fabrication tailored to each individual installation and by flexibility that results in the necessity of rebuilding the installation when changes are required and which so often occur.

It is an object of this invention to provide ducting for the carrying of and for the transposition of electrical conductors that handle large currents and which require support as well as transposition in order to avoid power losses as much as possible.

An object of this invention is to provide bus ducting for the accommodation of electrical conductors which allows for limited or restricted movements of said conductors in order to provide a certain amount of freedom to reduce stressing of said conductors. With the present invention the ducts receive the electrical conductors with extra space or clearance, to the end that the conductors are free to have limited movement in the event stresses such as are applied when short-circuiting is encountered.

It is an object of this invention to provide bus ducting for the support and transposition of electrical conductors which is adapted to receive and accommodate bare conductors, without insulation, said ducting being fabricated of insulating material and adapted to isolate the conductors from each other.

It is also an object of this invention to provide bus ducting of the character referred to that is adapted to be prefabricated in like, or identical, units of construction which are interchangeable. Said units of construction are adapted to be assembled with facility and the mode of assembly determines the transposition of conductors carried thereby.

Another object of this invention is to provide bus ducting of the character thus far referred to that includes, in addition to the above mentioned like or identical units of construction, a coupling element in the form of a junction box, or the like, that cooperatively engages between the ducting units to properly relate them for positive predetermined transposition of the conductors carried thereby.

It is still another object of this invention to provide ducting units and junction boxes therefor that are ventilated for cooling purposes in order to dissipate heat that is ordinarily generated within such an installation. Said ventilation includes air conducting passages and the provision of air moving and exhausting means.

Further, it is an object of this invention to provide a highly practical unitized construction for the handling of electrical busses and resulting in flexibility and adaptability of installation.

Figure 2:
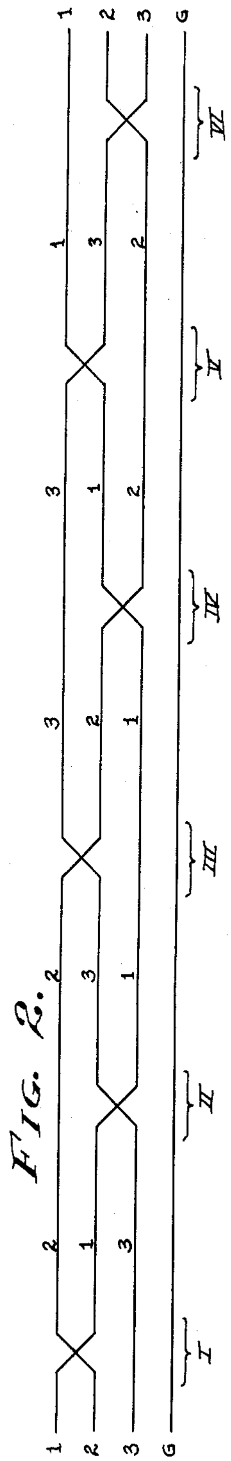
Figure 9:
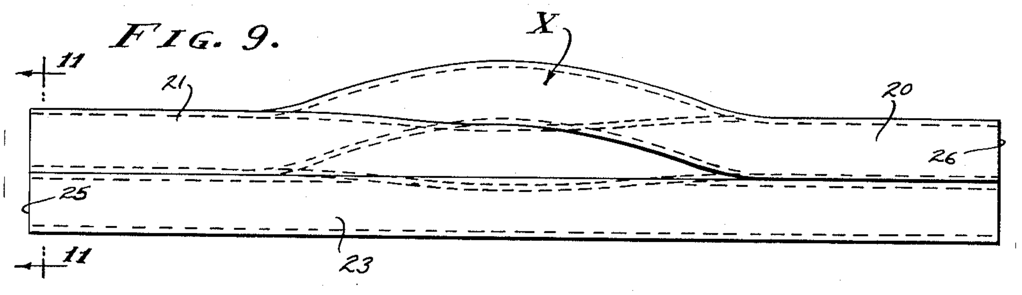
Figure 10:
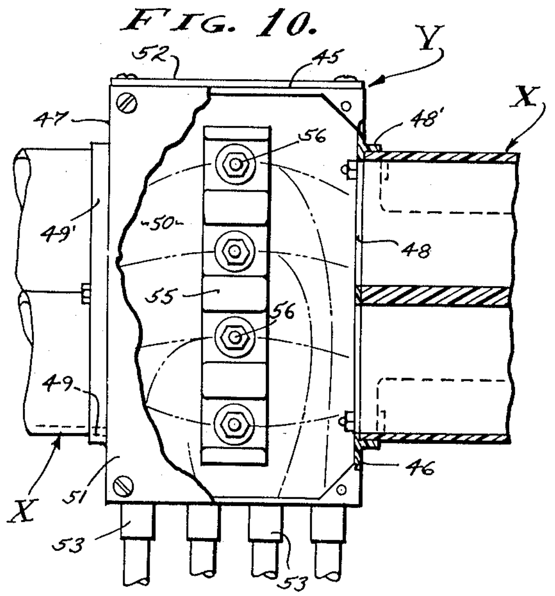
Figure 11:
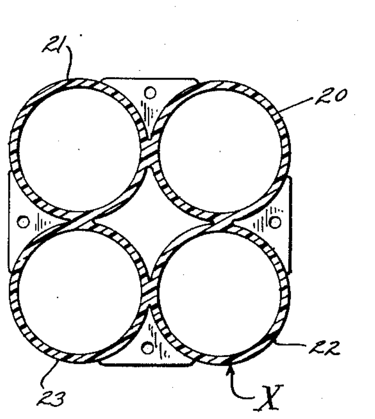
Figure 12:
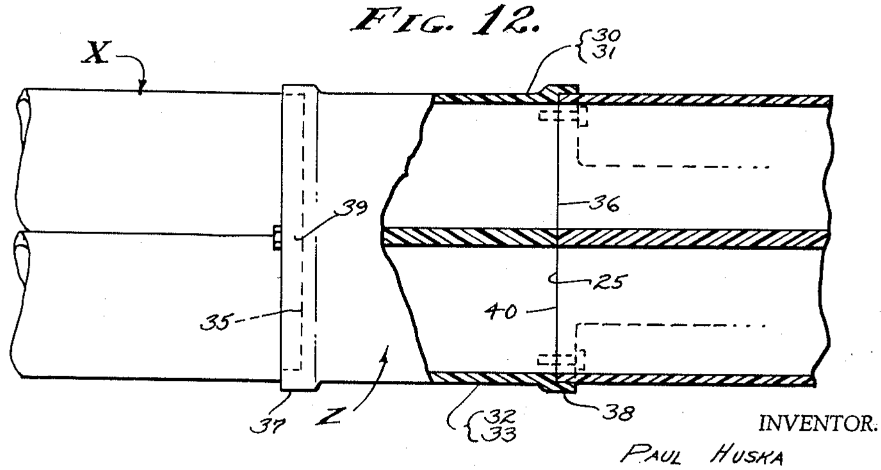

The various objects and features of my invention will be fully understood from the following detailed description of the typical preferred form and application thereof, throughout which description reference is made to the accompanying drawings, in which:

FIG. 1 is a side view of a typical bus ducting installation employing the units of construction provided by the present invention. FIG. 2 is a diagram illustrating the transposition of circuitry involved. FIGS. 3, 4, 5, 6, 7 and 8 are transverse sectional views taken as indicated by lines 3—3, 4—4, 5—5, 6—6, 7—7, and 8—8 on FIG. 1, respectively. FIG. 9 is an enlarged view of a portion of the structure shown in FIG. 1. FIG. 10 is an enlarged detailed view of the coupling means or junction box provided by the present invention, and FIG. 11 is a transverse sectional view taken as indicated by line 11—11 on FIG. 9. FIG. 12 is a longitudinal view of the structure with portions broken away to show parts in section.

In FIG. 1 of the drawings a typical installation is shown wherein the phases of the power circuit are transposed to reverse the relationship of conductors and to return them back to their original disposition. The physical transposition that occurs in the ducting that I provide is diagrammatically illustrated in FIG. 2 of the drawings wherein pairs of conductors are transposed at a time, there being three transpositions in order to reverse the relationship of conductors and three additional transpositions in order to return them to their original disposition. As clearly illustrated, each transposition shown in FIGS. 1 and 2 is individually detailed in FIGS. 3–8, inclusive.

As best illustrated in FIG. 2, the particular power circuit involved is a usual three phase circuit involving phases 1, 2 and 3, and a ground G. Normally, the three phases, 1, 2 and 3, and the ground G, run or extend parallel with each other. As the mode of transposition I transpose, or cross, two conductors at a time, the remaining conductors being unmoved and allowed to continue parallel with each other. Therefore, assuming that the phases are related in numerical sequence, for example, 1, 2 and 3, as indicated at the left in FIG. 2, first one pair of conductors and then the other pair of conductors are transposed, and so on. More specifically: transposition I involves crossing of phases 1 and 2; transposition II, the crossing of phases 1 and 3; transposition III, the crossing of phases 2 and 3; transposition IV, the crossing of phases 1 and 2; transposition V, the crossing of phases 1 and 3; and transposition VI, the crossing of phases 2 and 3. The ground G can run continuously unmoved and parallel, as shown, but, it will be seen that the relative positioning of the phases is reversed by means of three transpositions and is then returned to the original position by means of three additional transpositions. It will also be apparent that any number of transpositions can be employed, as circumstances require, depending upon the length of the duct installation.

In accordance with the invention, each transposition involves a multi-tubular unit X characterized by a tube adapted to accommodate and carry each conductor, including the ground G, and by the transposing or crossing of one pair of tubes, preferably crossing adjacent tubes. Further, each transposition involves one or more junction boxes Y coupling the multi-tubular units X one to another and orienting them in a predetermined relationship that assures proper transposition of the electrical conductor phases 1, 2 and 3. The multi-tubular units X are alike, or identical, and they are installed intermediate the junction boxes Y, said units X being rotatably positioned upon installation thereof and registered and mated with the junction boxes Y to effect said predetermined transposition.

As shown throughout the drawings each multi-tubular unit X is an elongate element involving four ducts—20, 21, 22 and 23—each duct being adapted to receive and accommodate one or more conductors. Although the ducts can vary widely in cross sectional configuration, I prefer to form the ducts cylindrically with round outer walls. Basically, the four ducts run in a group and parallel with each other and also coextensive with each other. That is, the four ducts are tangentially related and nested together leaving a central void or space therebetween. The ducts terminate in co-planar faces 25 and 26 at the opposite ends of the unit X, said faces 25 and 26 being at right angles and normal to the longitudinal axis of the unit X. It is to be understood that curved, rather than straight units can be provided in which case the planes of the end faces 25 and 26 will be angularly related to each other (not shown).

The present invention is characterized by the transposing or crossing of a pair of the ducts, and in the case illustrated the ducts 20 and 21 are transposed or crossed. Note, however, that the ducts 22 and 23 are unmoved and continue parallel with each other. In order to establish the transposition of a pair of ducts 20 and 21, one of said ducts is raised allowing the other to pass beneath the same. For example, the duct 20 is raised laterally away from the two straight ducts 22 and 23 while the duct 21 is turned to pass the duct 20 and the said ducts 22 and 23. In actual practice, the duct 21 drops into or between the pair of ducts 22 and 23, as it traverses from its initial position over the duct 22 to its transposed position over the duct 23. Conversely, the duct 20 traverses from its initial position over the duct 23 to its transposed position over the duct 20, being lowered back into nesting engagement with the group of ducts.

The ducts 20, 21, 22 and 23 are preferably of the same size and cross section and are fabricated by extrusion or molding, or any other suitable method of manufacture. In accordance with the invention the said ducts are made of insulating or dielectric material, such as a plastic material, for example, phenolic, or an epoxy resin. In any case, the final product or form, is substantially rigid so as to hold its shape and it is preferably made of a material that is heat and fire resistant. In any case, it is a simple matter to form the straight ducts 22 and 23 and it is also a simple matter to establish the required bends or turns in the ducts 20 and 21. The latter ducts 20 and 21 can be initially formed or molded with the necessary transpositions therein, or they can be formed and then cured with said transpositions therein.

With the multi-tubular unit X formed as above described, the ducts 20—23 are preferably fused or bonded together forming a rigid and permanent construction. It will be apparent that one pair of ducts are crossed and interchange positions with each other, while the other pair of ducts remain straight and parallel. Any suitable means of fusion or adhesion can be employed to secure the four ducts together as a unit.

Figures 3, 4, 5, 6, 7, 8:
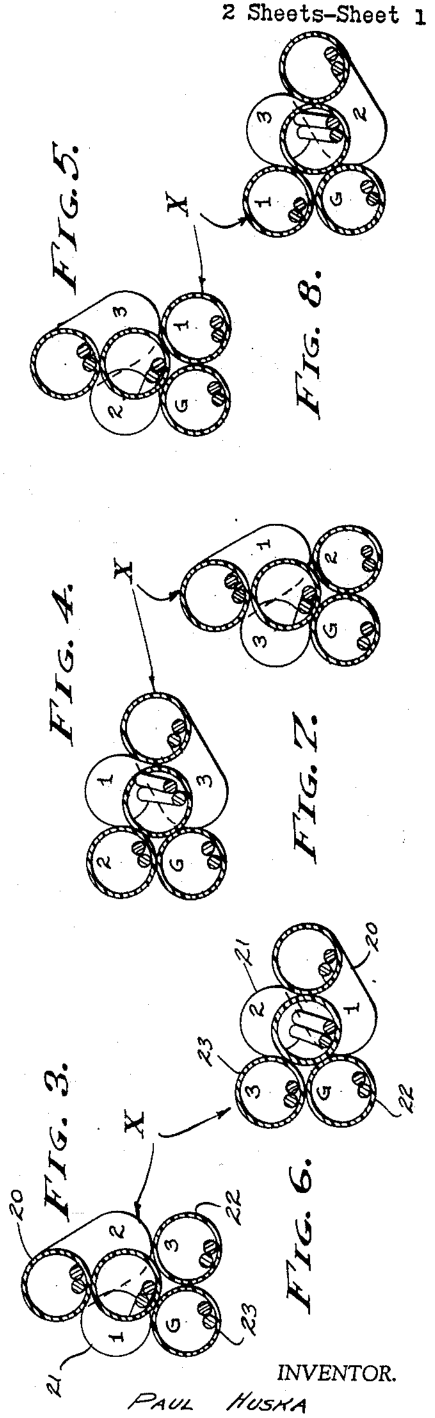

In order to establish transposition I as shown in FIGS. 1 and 3, the first multi-tubular unit X is rotatably oriented so that the phases 1 and 2 are received by and accommodated in the ducts 20 and 21, respectively. The phase 3 and ground G are then received by and accommodated in the ducts 22 and 23. Since the ducts 20 and 21 are crossed intermediate the ends of the unit X, so are the phases 1 and 2.

In order to establish transposition II as shown in FIGS. 1 and 4, the second multi-tubular unit X is rotated 90° relative to the second and preceding unit X, and to the position of the first unit X, and oriented so that the phases 2 and 3 are received by and accommodated in the ducts 20 and 21, respectively. The phase 1 and ground G are accommodated in the ducts 22 and 23, and the phases 2 and 3 are transposed by the crossing of the ducts 20 and 21.

The remaining transpositions IV, V and VI will be apparent from an examination of FIGS. 6, 7 and 8, respectively, wherein the multi-tubular units X are alternately rotated 90° between the two above mentioned positions in order to receive and accommodate the wires to be transposed in the transposing ducts 20 and 21.

The coupling Y and junction box Z are essentially the same, each acting to couple the opposed ends 25 and 26 of the multi-tubular unit X. As shown, the units X are arranged end to end with the end faces 25 and 26 in opposition and with the individual ducts 20—23 aligned, as the case may be. In the case of the coupling Y the ducts are continued in the body of the coupling, while in the case of the junction box Z the ducts terminate at the body of the box so that appropriate electrical connections can be established with the conductors of phases 1, 2 and 3 and the ground G. As indicated, the coupling Y and box Z are made of insulating material, preferably the same material as the units X.

The coupling Y is a connector-type element involving four duct members 30, 31, 32 and 33 joined together in the same manner as the ducts of the unit X. However, the coupling Y is relatively short with flat ends 35 and 36 normal to the axes of the duct members. It will be apparent, however, that said ends 35 and 36 can be angularly related if desired.

It is preferred that the coupling Y be provided with flanges 37 and 38 at the ends 35 and 36, said flanges acting to fit with and mate the units X to the end that the four ducts of the unit X register and are keyed with the four ducts of the coupling Y. Further, lugs 39 are provided on the coupling Y to receive fasteners provided to draw the parts into tight engagement with each other. As shown, the point of joinder can be sealed by a gasket, or by a mastic, or an adhesive, at 40.

The junction box Z is a connector-type element involving a box-like body 45 having opposite parallel side walls 46 and 47 to engage the flat ends 25 and 26 of the opposed units X. There are openings 48 and 49 in the two walls with flanges 48' and 49' corresponding to the flanges of the coupling Y. The flanges 48' and 49' act to fit with and mate the unit X to the end that the said units X are rotatively keyed to the side walls 46 and 47, respectively. The junction box Z has a chamber 50 therein closed at the front by a cover 51 and at its top by a plate 52. Further, receptacle tubes 53 enter the box Z, as at the bottom thereof, to pass electrical leads from the chamber 50.

In order to make electrical connection within the chamber a terminal strip 55 is provided therein with studs 56 to connect the conductors involved (four studs as shown). When the cover 51 is applied the chamber 50 is closed, to the end that the ducts within the assembly are entirely enclosed and shut off from the surrounding atmosphere.

As shown in FIG. 1, the plates 52 can be removed and replaced with ventilating means. For example, a blower 60 is installed on one of the centrally located junction boxes Z and vents 61 are installed on the opposite or remote junction boxes Z. Thus, heated air is removed through the open ducts 20—23 that are in open communication with each other through the couplings Y and boxes Z.

From the foregoing it will be readily understood that the bus ducting that I provide is extremely versatile and flexible in its use and installation. The ducts per se are considerably larger in diameter than the conductors involved, leaving ample space for ducting cooling air therethrough. Further, the conductors can be formed of bare wire, having ample room for limited freedom of movement, and are readily pulled into place within the ducts and removed and/or replaced with a minimum of effort.

Having described only the typical preferred form and application of my invention, I do not wish to be limited or restricted to the specific details herein set forth, but wish to reserve to myself any variations or modifications that may appear to those skilled in the art and fall within the scope of the following claims.

Having described my invention, I claim:

1. An electrical bus duct of the character described for the transposition of conductors and including, an elongate multi-tubular unit having at least three adjacently straight and parallel elongate ducts, and one pair only of said adjacent ducts being crossed so as to transpose the conductors carried therein as they extend between the opposite ends of the unit.

2. An electrical bus duct of the character described for the transposition of conductors and including, a plurality of like elongate multi-tubular units each having at least three adjacently straight and parallel elongate ducts terminating in flat opposing ends normal to the longitudinal axis, and one pair only of said adjacent ducts being crossed transversely of said axis, so as to transpose conductors carried therein as they extend between the opposite ends of the unit.

3. An electrical bus duct of the character described for the transposition of conductors and including, a plurality of like elongate multi-tubular units fabricated of insulating material and each having at least three adjacently straight and parallel elongate ducts terminating in flat opposing ends normal to the longitudinal axis, and one pair only of said ducts being crossed so as to transpose the conductors carried therein as they extend between the opposite ends of the unit.

4. Electrical bus ducting of the character described for the transposition of conductors and including, a series of like elongate multi-tubular units adapted to be arranged in end to end relationship and each having at least three adjacently straight and parallel ducts, said units being rotatably positioned relative to each other in order to be selectively mated with each other, and one pair of said adjacent ducts of each unit being crossed so as to transpose the conductors carried therein as they extend between the ends of the unit, whereby selective pairs of conductors are transposed.

5. Electrical bus ducting of the character described for the transposition of conductors and including, a series of like elongate multi-tubular units adapted to be arranged in end to end relationship and each having at least three adjacently straight and parallel ducts, one pair only of said adjacent ducts being crossed so as to transpose the conductors carried therein as they extend between the ends of the unit, and a coupling at the opposing ends of the units and joining them together in fixed relationship.

6. Electrical bus ducting of the character described for the transposition of conductors and including, a series of like elongate multi-tubular units adapted to be arranged in end to end relationship and each having at least three adjacently straight and parallel ducts, one pair only of said adjacent ducts being crossed so as to transpose the conductors carried therein as they extend between the ends of the unit, and a multi-tubular coupling intermediate the opposing ends of the units and joining them together and forming continuations of the ducts of said units.

7. Electrical bus ducting of the character described for the transposition of conductors and including, a series of like elongate multi-tubular units adapted to be arranged in end to end relationship and each having at least three adjacently straight and parallel ducts, one pair only of said adjacent ducts being crossed so as to transpose the conductors carried therein as they extend between the ends of the unit, and means coupling the opposing ends of the units and comprising connectors for joining lateral conductors to the conductors extending through the ducts of the units.

8. Electrical bus ducting of the character described for the transposition of conductors and including, a series of like elongate multi-tubular units adapted to be arranged in end to end relationship and each having at least three adjacently straight and parallel ducts, one pair only of said adjacent ducts being crossed so as to transpose the conductors carried therein as they extend between the ends of the unit, and a junction box coupling intermediate the units joining the opposing ends thereof together and comprising connectors for joining lateral conductors to the conductors extending through the ducts of the units.

References Cited in the file of this patent

UNITED STATES PATENTS

| | | |
|---|---|---|
| 411,427 | Dashiell | Sept. 24, 1889 |
| 1,776,484 | Whitehouse | Sept. 23, 1930 |
| 1,785,403 | Babb | Dec. 16, 1930 |
| 1,798,205 | Jewell | Mar. 31, 1931 |
| 2,033,743 | Shoemaker | Mar. 10, 1936 |
| 2,861,119 | Collonge | Nov. 18, 1958 |